Patented Nov. 25, 1947

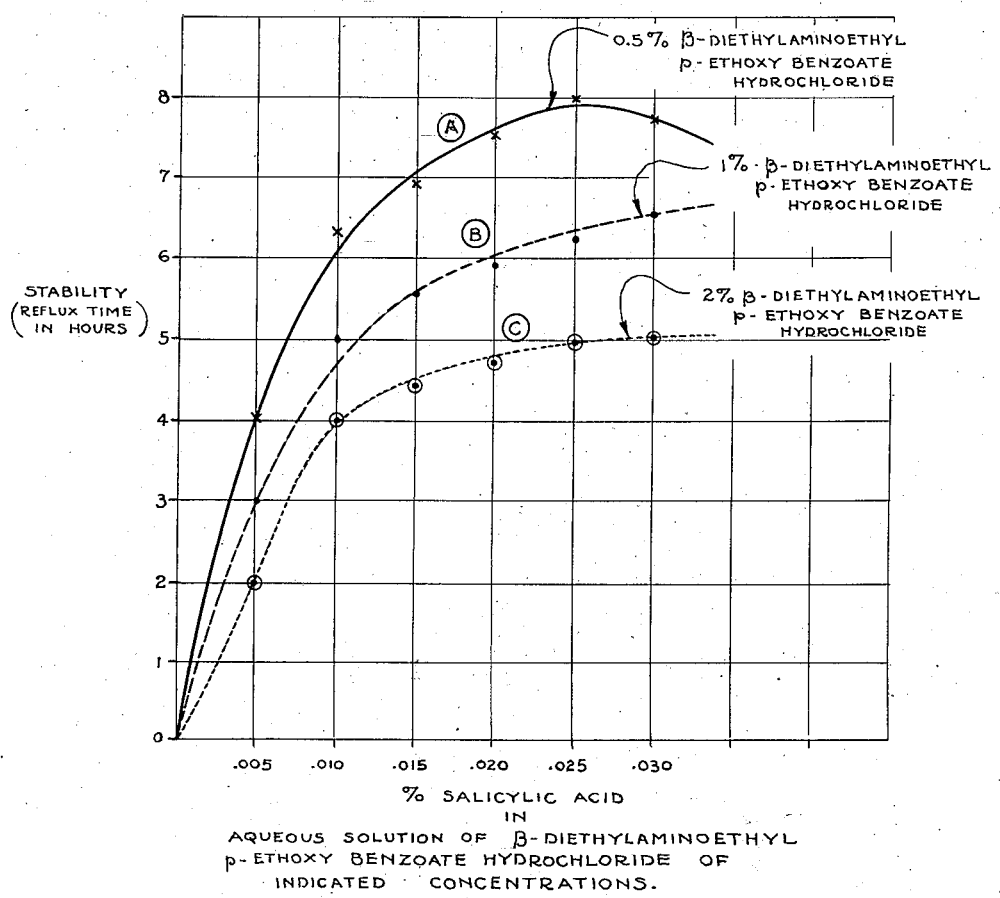

2,431,553

UNITED STATES PATENT OFFICE 2,431,553

STABILIZED SOLUTIONS OF LOCAL ANESTHETICS

William F. Hamilton, Altadena, Calif., assignor to Frederick M. Turnbull, Los Angeles, Calif.

Application July 24, 1945, Serial No. 606,804

2 Claims. (Cl. 167—52)

This invention relates to the stabilization of aqueous solutions of β-diethylaminoethyl p-ethoxybenzoate hydrochloride which are useful local anesthetics. In aqueous solution, this anesthetic slowly hydrolyzes to form p-ethoxybenzoic acid which is relatively insoluble. Precipitation of this acid occurs, rendering the pharmaceutical unfit for therapeutic uses, especially injection.

This invention is directed to the stabilization of an aqueous solution of β-diethylaminoethyl p-ethoxybenzoate hydrochloride against those factors tending to cause the formation of a precipitate therein upon prolonged standing which renders the solution unfit for use. β-diethylaminoethyl p-ethoxybenzoate hydrochloride is known and commercially sold under the trade names "Diethoxin" and "Intracaine."

β-Diethylaminoethyl p-ethoxybenzoate hydrochloride is a local anesthetic possessing great efficacy and other desirable properties rendering desirable its more extended use. For example, in man and in other animals it is effective in about have the strength of novocaine or of procaine (β-diethylaminoethyl p-aminobenzoate hydrochloride) and produces an infiltration or nerve block anesthesia which lasts appreciably longer than that produced by an equivalent amount of such novocaine or procaine. β-diethylaminoethyl p-ethoxybenzoate hydrochloride is more immediate and uniform in its action than novocaine and in most instances is as effective without the addition of epinephrine, as is novocaine with epinephrine, probably because of its longer duration of activity and because of its greater tendency to spread beyond the immediate zone of infiltration.

The use of this local anesthetic has been restricted by the fact that in a comparatively short time after an aqueous solution is formed of a concentration desirable for intravenous injection, e. g., up to 2%, a precipitate may be formed after sterilizing, rendering the solution unfit for such use. For example, if an aqueous solution of 1 or 2% of β-diethylaminoethyl p-ethoxybenzoate hydrochloride is refluxed continuously, in a short time, i. e., one hour, such a precipitate is formed after cooling. While only a small proportion, probably in the neighborhood of about 5%, of the total β-diethylaminoethyl p-ethoxybenzoate hydrochloride present in the aqueous solution precipitates after extended storage, the precipitate is sufficient to render the solution useless for injection.

The precipitate formed by hydrolysis of the β-diethylaminoethyl p-ethoxybenzoate hydrochloride:

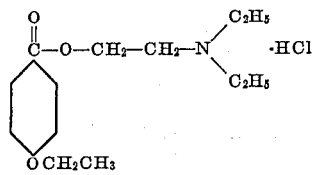

is the insoluble product p-ethoxybenzoic acid:

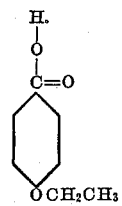

It has long been recognized that, if an aqueous solution of β-diethylaminoethyl p-ethoxybenzoate hydrochloride could be stabilized so that no precipitate was formed therein over those periods of time necessary to permit of its manufacture, distribution through the ordinary trade channels, and storage for reasonable periods by physicians and other users, the extent of use of this local anesthetic would be greatly enhanced. The period of time necessary to permit of such manufacture and distribution of such a solution varies, of course, with the character of the intended use of the solution, being less, for example, when the solution is distributed to hospitals directly for their use than when it is distributed to pharmacies for use by physician customers. The period of stability required for such a solution may be defined as that which is substantially greater than the maximum time that an aqueous solution of β-diethylaminoethyl p-ethoxybenzoate hydrochloride may be stored without precipitation and as including such greater periods of time, amounting even to years, e. g., two or three years, necessary for its distribution through those commercial channels in which it is stored for the greatest periods, and it is such stabilization that is meant when there is employed herein the term "stabilized solution" or the stabilizing agent is referred to as "providing stability."

Although such recognition and the demand for such a stabilized solution has long existed and it has been quite apparent to those skilled in the art that the provision of such a stabilized solution would provide substantial profit to its originator, no one, to the best of my knowledge and belief, has discovered any agent capable of so stabilizing such a solution.

In accordance with my invention such a solution may be readily stabilized to the required extent, as defined hereinbefore, by the addition thereto of relatively small amounts of salicylic acid.

Although I do not wish to be bound by the theory, my experiments indicate that probably salicylic acid, having the formula:

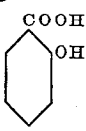

reacts with the p-ethoxybenzoic acid, having the formula:

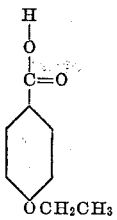

to form the product p-ethoxybenzoyl salicylic acid, having the formula:

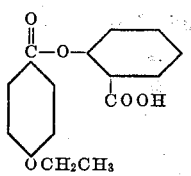

I have discovered that salicylic acid will not cause the p-ethoxybenzoic acid, after it has precipitated, to redissolve in an aqueous solution of β-diethylaminoethyl p-ethoxybenzoate hydrochloride. I have discovered that the same quantity of salicylic acid added to an aqueous solution of β-diethylaminoethyl p-ethoxybenzoate hydrochloride of the same concentration, prior to the precipitation of any p-ethoxybenzoic acid, will prevent the precipitation of p-ethoxybenzoic acid; for example, when an aqueous solution of β-diethylaminoethyl p-ethoxybenzoate hydrochloride in concentration of 1% is refluxed for one hour and cooled, p-ethoxybenzoic acid precipitates. While this precipitate is redissolved when the solution is reheated, it is again precipitated when the solution is cooled. When there is added to this solution salicylic acid in concentration of .005%, the precipitate is dissolved upon heating the solution, but again precipitates when the solution is cooled.

When salicylic acid in concentration of .005% is added initially to an aqueous solution of β-diethylaminoethyl p-ethoxybenzoate hydrochloride in concentration of 1%, and the solution is refluxed for one hour, no precipitate is formed on cooling, and the solution remains stable for extended periods of time.

While I do not wish to be bound by this theory, I believe that the explanation of this phenomenon is that the p-ethoxybenzoic acid in its nascent state may react with the salicylic acid to form a somewhat water-soluble reaction product, p-ethoxybenzoyl salicylate, and that the p-ethoxybenzoic acid, after passing through its nascent state, is less reactive to such an extent that it reacts not at all or not to an appreciable extent with the salicylic acid.

Thus, in accordance with the invention, I have secured varying degrees of stability of a 1% solution of β-diethylaminoethyl p-ethoxybenzoate hydrochloride with varying concentrations of salicylic acid. A 0.1% concentration of salicylic acid in such a solution of β-diethylaminoethyl p-ethoxybenzoate hydrochloride stabilized the solution, so that, when it was maintained in a stoppered flask in a water bath, at a temperature of 105° F. for three months, there was formed only a very slight amount of precipitate after cooling. Employing concentrations of 0.06%, 0.05%, and 0.035% of salicylic acid in a 2% solution of β-diethylaminoethyl p-ethoxybenzoate hydrochloride, it was found that, when the solutions were subjected to identical conditions for three months, the quantity of precipitate formed after cooling decreased with decreasing concentration of salicylic acid.

It is believed that the optimum concentration of the salicylic acid for stabilizing a 1% solution of β-diethylaminoethyl p-ethoxybenzoate hydrochloride is 0.0229 gram per gram of drug in solution. This belief is based upon the assumption that equimolal proportions are required.

If it be assumed that 5% of β-diethylaminoethyl p-ethoxybenzoate hydrochloride in a 1% aqueous solution of 100 cc. hydrolyzes, there is provided $$.05 \times \frac{166}{302}$$

or 0.0275 gram of p-ethoxybenzoic acid.

If the salt is formed by a 1:1 reaction, then the number of grams of salicylic acid per 100 cc. of such 1% solution required for the reaction is $$0.0275 \times \frac{138}{166}$$

or 0.0229.

Confirming the above assumption, a 1% solution of β-diethylaminoethyl p-ethoxybenzoate hydrochloride without any salicylic acid forms a precipitate on cooling after only one hour of refluxing. When only .01% of salicylic acid is added to a 1% solution of β-diethylaminoethyl p-ethoxybenzoate hydrochoride, no precipitate is formed on cooling until refluxing has been continued for about four and a half hours, thus indicating that the solution has been stabilized to a substantial extent.

However, when there is added to such a solution .035 to .060% salicylic acid, the solution is stabilized to such an extent that no precipitate is formed in eight hours of continuous refluxing. Refluxing for eight hours constitutes a very rigorous test, undoubtedly more severe than required for commercial stability, i. e., stability against precipitation, in a sealed container for that period of time necessary to permit of its manufacture by a pharmaceutical house, its distribution through the regular channels of trade to the user, and its storage by the user until consumed.

It may be said therefore, that an aqueous solution of about 1% of β-diethylaminoethyl p-ethoxybenzoate hydrochloride is effectively stabilized in the commercial sense that the word is employed herein with concentrations of salicylic acid of less than .03%, the concentration of salicylic acid varying with the degree or extent of stabilization required.

For each concentration of β-diethylaminoethyl p-ethoxybenzoate hydrochloride in aqueous solution, there appears to be a definite optimum in the amount of salicylic acid which should be added to give maximum stability; for example, about .025% salicylic acid contained in a ½% aqueous solution gives greater stability than does either increasing or decreasing amounts of salicylic acid. Similarly, for a 1% solution of β-diethylaminoethyl p-ethoxybenzoate hydrochloride, the optimum is somewhat higher and lies between about .03 and about .1% salicylic acid added. Likewise, for the 2% concentration of β-diethylaminoethyl p-ethoxybenzoate hydrochloride, the optimum apparently lies between about .02 and about .04% salicylic acid in the β-diethylaminoethyl p-ethoxybenzoate hydrochloride.

This is probably due to the fact that the product formed by hydrolysis of β-diethylaminoethyl p-ethoxybenzoate hydrochloride and deposited as a precipitate indicative of the stability of the solution has a limited solubility, so that only enough salicylic acid need be added to the solution to reduce the quantity of such product formed or remaining in the solution to below its saturation point in the solution. Contributing to this phenomenon also is probably a variation in the solubility or saturation point of the product comprising the precipitate caused by the increased concentration in the solution of β-diethylaminoethyl p-ethoxybenzoate hydrochloride.

It is desirable also to employ in the solution no more than that quantity of salicylic acid necessary to provide the required stability, because, in accordance with this invention, it is desired to avoid the possibility of increased salicylate toxicity which such an excess of salicylic acid might induce.

Presented in the drawing are three curves, A, B, and C, representing concentrations of β-diethylaminoethyl p-ethoxybenzoate hydrochloride in aqueous solutions of 0.5, 1, and 2%, respectively. In each of these curves there is plotted the concentration of salicylic acid added to such aqueous solution, as the abscissa, against stability of the solution as measured in reflux time in hours required to produce noticeable precipitation after cooling, as the ordinate. As clearly appears from curve A, the optimum percentage of salicylic acid for providing stability to an aqueous solution of 0.5% of β-diethylaminoethyl p-ethoxybenzoate hydrochloride is about 0.025%. As clearly appears from curve B, the effect of increasing increments of the concentration of the salicylic acid in an aqueous solution of 1% β-diethylaminoethyl p-ethoxybenzoate hydrochloride diminishes above about .010%. As appears from curve C, the effect of an increase in the increments of percentage of salicylic acid added to an aqueous solution of 2% β-diethylaminoethyl p-ethoxybenzoate hydrochloride diminishes above about .010%.

For all such solutions, including those up to about 2% β-diethylaminoethyl p-ethoxybenzoate hydrochloride, a concentration of salicylic acid of .0125 gram per gram of β-diethylaminoethyl p-ethoxybenzoate hydrochloride in aqueous solution provides stability in about five hours or more of refluxing without the formation of a precipitate upon cooling of the solution. It may be said that each hour of such refluxing followed by cooling is the equivalent of about three months storage in a stoppered container at room temperature of about 20° C. in its effect upon the formation of a precipitate in the solution.

Hence the stability provided by such a concentration of .0125 gram of salicylic acid per gram of β-diethylaminoethyl p-ethoxybenzoate hydrochloride in aqueous solution will stabilize the solution for a period of the order of years, as contrasted with the stability of an aqueous solution of β-diethylaminoethyl p-ethoxybenzoate hydrochloride of the order of months in the absence of salicyclic acid, and such a concentration of salicyclic acid as a stabilizing agent in an aqueous solution of β-diethylaminoethyl p-ethoxybenzoate hydrochloride is embraced within the term "stabilized solution" and the term "providing stability," as employed herein.

It will be obvious to anyone skilled in the art from the data herein presented and from the curves in the drawing that the concentration of salicyclic acid added to an aqueous solution of a given concentration of β-diethylaminoethyl p-ethoxybenzoate hydrochloride may be varied as determined by the degree of stability required for the intended use of the solution. The concentration of salicyclic acid for the stability required for various uses falls between approximately 0.5 and 2.5% of the β-diethylaminoethyl p-ethoxybenzoate hydrochloride present in the solution.

There may be added to the stabilized solutions of β-diethylaminoethyl p-ethoxybenzoate hydrochloride previously described a suitable vasoconstrictor, such as desoxyephedrine hydrochloride, neosynephrine hydrochloride, amphetamine sulfate or hydrochloride, or epinephrine hydrochloride in concentration to provide the desired restriction to local absorption of the β-diethylaminoethyl p-ethoxybenzoate hydrochloride and the avoidance of its systemic absorption.

By way of example, about .02% of desoxyephedrine in an aqueous solution of about 1% β-diethylaminoethyl p-ethoxybenzoate hydrochloride with salicylic acid in concentration of about .0125% to provide the desired stability has been found suitable for this purpose. Likewise a concentration of epinephrine in the solution in the proportions of about 1:50,000 is suitable for this purpose.

Unexpected results are secured utilizing a stabilized aqueous solution of β-diethylaminoethyl p-ethoxybenzoate hydrochloride with a suitable vasoconstrictor therein when applied to the surface of mucous membrane or other tissue, in that both the anesthetic effect of the β-diethylaminoethyl p-ethoxybenzoate hydrochloride and the constricting effect of the vasoconstrictor are enormously enhanced. β-diethylaminoethyl p-ethoxybenzoate hydrochloride, when applied alone to the surface of mucous membrane or other tissue, has very little anesthetic effect, and it is for that reason that its use has heretofore been substantially confined to hypodermic injection where its anesthetic effect is secured by infiltration. Vasoconstrictors, when applied to such surfaces, have no substantial constricting effect in minute concentrations; for example, the constricting effect of desoxyephedrine hydrochloride is not secured to a desired extent in concentrations of this vasoconstrictor alone in aqueous solution of less than about 1%.

In spite of these facts, utilizing a solution of .02% of desoxyephedrine hydrochloride in an aqueous solution of about 1% β-diethylaminoethyl p-ethoxybenzoate hydrochloride stabilized with salicyclic acid in concentration of about .0125%, it has been found that both very substantial vasoconstrictive and anesthetic effects are secured upon surface application to mucous membrane and other tissue. While I do not wish to be restricted to any explanation of this surprising result, the evidence makes it appear extremely probable either that synergism or compound formation occurs between the vasoconstrictor and β-diethylaminoethyl p-ethoxybenzoate hydrochloride, the hydrolysis products of β-diethylaminoethyl p-ethoxybenzoate hydrochloride, or the salicyclic acid, or all or some of them.

Because of such effects, it is desirable in some instances to add to an aqueous solution of novocaine a vasoconstrictor with salicyclic acid in concentrations of the order of those hereinbefore set forth, in order to enhance the anesthetic effect of the β-diethylaminoethyl p-aminobenzoate hydrochloride and the constricting effect of the vasoconstrictor while utilizing reduced concentrations of both.

From the foregoing specific examples given only by way of illustration of the invention, it will be seen that for any given concentration of the β-diethylaminoethyl p-ethoxybenzoate hydrochloride in aqueous solution up to the limit of its usefulness there is employed as a stabilizing agent that concentration of salicyclic acid which is compatible with the solution in the sense that it is great enough to enhance substantially the period of time within which no precipitation occurs in the solution over that period of time in which such precipitation would occur in the absence of the salicyclic acid and in the sense that the concentration is less than its saturation point and that concentration inducing precipitation of the products of the reaction between salicyclic acid or its ions and β-diethylaminoethyl p-ethoxybenzoate hydrochloride or its ions or between the hydrolysis reaction products of the ions of salicyclic acid with the hydrolysis reaction products of β-diethylaminoethyl p-ethoxybenzoate hydrochloride.

While the specific examples hereinbefore set forth are illustrative of my invention, my invention is to be understood as not restricted to such examples, but as embracing all modifications thereof coming within the scope of the claims which follow.

I claim as my invention:

1. An aqueous solution of β-diethylaminoethyl p-ethoxybenzoate hydrochloride containing salicyclic acid as a stabilizing agent.

2. An aqueous solution of β-diethylaminoethyl p-ethoxybenzoate hydrochloride containing salicyclic acid as a stabilizing agent in an amount between approximately 0.5 and 2.5% of the β-diethylaminoethyl p-ethoxybenzoate hydrochloride.

WILLIAM F. HAMILTON.

REFERENCES CITED

The following references are of record in the file of this patent:

UNITED STATES PATENTS

| Number | Name | Date |
|---|---|---|
| 1,690,705 | Seydel | Nov. 6, 1928 |
| 1,924,685 | Goldberg | Aug. 29, 1933 |

FOREIGN PATENTS

| Number | Country | Date |
|---|---|---|
| 460,629 | Great Britain | Jan. 29, 1937 |

OTHER REFERENCES

Gutman, Modern Drug Encyclopedia, 2d ed. (1941), page 305. (Copy in Division 43.)

Certificate of Correction

Patent No. 2,431,553. November 25, 1947.

WILLIAM F. HAMILTON

It is hereby certified that errors appear in the printed specification of the above numbered patent requiring correction as follows: Column 6, lines 2, 2 and 3, 11, 16, and 65; column 7, lines 2, 6, 19, 25, 28, 31 and 32; column 8, lines 9 and 10, 12 and 13, for the word "salicyclic" read *salicylic*; and that the said Letters Patent should be read with these corrections therein that the same may conform to the record of the case in the Patent Office.

Signed and sealed this 2nd day of March, A. D. 1948.

[SEAL]

THOMAS F. MURPHY,
*Assistant Commissioner of Patents.*